United States Patent Office 3,790,639
Patented Feb. 5, 1974

---

3,790,639
PROCESS FOR PRODUCING A WATER-SOLUBLE METHYLOL PHOSPHINE-PHENOL ADDUCT
Donald J. Daigle, New Orleans, and George L. Drake, Jr., and Wilson A. Reeves, Metairie, La., assignors to the United States of America as represented by the Secretary of Agriculture
No Drawing. Original application May 7, 1971, Ser. No. 141,356. Divided and this application Mar. 28, 1972, Ser. No. 238,928
Int. Cl. C07f 9/50
U.S. Cl. 260—606.5 P          8 Claims

ABSTRACT OF THE DISCLOSURE

Soluble methylol phosphine adducts are prepared by reacting tris(hydroxymethyl)phosphine with substituted or unsubstituted phenol which contains one or more hydrogens ortho or para to the phenolic hydroxyl group. These adducts are convenient and useful for (a) the preparation of flame resistant polymers and (b) the preparation of flame- and glow-resistant organic fibrous materials and flame-, glow-, wrinkle-, and shrink-resistant woven and knit textiles which contain about 25% or more cellulosic fibers.

---

This is a division, of application Ser. No. 141,356 filed May 7, 1971.

A non-exclusive, irrevocable, royalty-free license in the invention herein described, throughout the world for all purposes of the United States Government, with the power to grant sublicenses for such purposes, is hereby granted to the Government of the United States of America.

This invention relates to new phosphorus compounds; to phosphorus and nitrogen containing polymers; and to processes for their use in the production of flame-resistant organic fibrous material. More specifically, it deals with a method of producing soluble phenolic-methylol phosphine aducts and the use of these to produce insoluble polymers and flame-resistant organic fibrous products through reaction of the adduct with nitrogeneous compounds.

As employed throughout the specifications and claims of this invention, the term THP refers to the compound tris(hydroxymethyl)phosphine. The term phenolic-methylol phosphine adduct refers to soluble compounds produced by reacting THP with certain phenolic compounds.

Copending application Ser. No. 141,447, filed May 7, 1971, now U.S. Pat. No. 3,745,191 by Daigle, Reeves, and Drake relates to the production and use of polymers made by reacting THP with halogen substituted phenols which contain one or more hydrogens ortho or para to the phenolic hydroxyl group.

Copending application Ser. No. 141,466, filed May 7, 1971, now U.S. Pat. No. 3,734,684, by Donaldson, Daigle, Drake, Reeves, and Beninate, relates to soluble methylol phosphine adducts prepared by reacting THP with a monomeric nitrogenous compound which contains at least one member of the group consisting of hydrogen atoms and methylol radicals attached to trivalent nitrogen atoms.

A primary object of the present invention is to provide soluble phenolic-methylol phosphine adducts which are capable of further reaction with certain nitrogenous agents to produce thermosetting flame-resistant polymers and flame-resistant organic fibrous materials.

We have discovered that THP reacts with phenolic compounds which contain one or more hydrogen atoms attached to ring carbons at ortho and para positions to the phenolic group to produce soluble phenolic-methylol phosphine adducts. We have also discovered that these adducts can be further reacted with nitrogenous compounds which contain at least two members of the group hydrogen atoms and methylol radicals attached to trivalent nitrogen to produce flame-resistant polymers and flame- and wrinkle-resistant textile products.

More specifically, the products and processes of our invention may be described as follows:

(1) Soluble phenolic-methylol phosphine adducts are made in solution which have a pH about from 6 to 8 by reacting THP with a phenol which has at least one hydrogen attached to a ring carbon, ortho or para to the phenolic hydroxyl group. In order to make the soluble and useful adducts of this invention, there must be an excess of methylol phosphorus radical (P—CH$_2$OH) in the adduct. For purposes of the reaction, THP is trifunctional; the functionality of the phenol is determined by the number of hydrogen attached to aromatic carbons ortho or para to the phenolic OH group. The adducts of this invention are essentially materials which contain the structures of the group consisting of

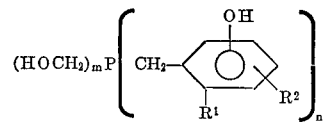

where $m$ and $n$ are integers of 1 or 2 and the sum of $m + n$ is 3, and wherein $R^1$ is a member of the group consisting of OH, SO$_3$H, H, and $R^2$ is a member of the group consisting of OH, H, alkyl and aryl.

(2) To produce thermo-setting polymers in accordance with this invention the phenolic methylol phosphine adduct is reacted with a nitrogenous compound containing at least two members of the group consisting of hydrogen atoms and methylol radicals attached to trivalent nitrogen atoms. The reaction is carried out by dissolving the phenolic methylol phosphine adduct and the nitrogenous compound in a suitable medium and then heating as needed until a viscous solution and finally a solid polymer is produced. Polymers produced by this process are insoluble, thermosetting, and flame resistant. The polymers contain a reoccurring trimethylene phosphorus radical P(CH$_2$—)$_3$ which can be oxidized to a trimethylene phosphine oxide structure OP(CH$_2$)$_3$.

(3) To product flame resistant organic textiles by a heat cure process the textile structure is wetted with a solution containing the methylol phosphorus adduct and a nitrogenous compound containing at least two members of the group consisting of hydrogen atoms and methylol radicals attached to trivalent nitrogen atoms, then drying and heating the textile at a temperature ranging about from 110° to 160° C. for a period of time necessary to promote copolymerization of the methylol phosphine adduct and the nitrogenous agent within or on the textile structure.

(4) To produce flame resistant organic textiles by an ammonia cure process, the textile structure is wetted with a solution containing the methylol phosphine adduct and the aforesaid nitrogenous compound, then the textile is dried, and fiinally the dried textile is exposed to ammonia or amine gas. The amount of ammonia or amine applied to the dried textile is sufficient to react with substantially all of the P methylol radicals. One ammonia atom is capable of reacting with three P methylol radicals. The resulting product is insoluble in essentially all solvents and the flame resistant product formed in the textile is resistant to laundering and drycleaning.

Phenolic compounds suitable for use in making soluble adducts of this invention include phenol, o-cresol, m-cresol, p-cresol, catechol, resorcinol, hydroquinone, and phloroglucinol. The primary requirement for the phenol is that it contain at least one hydrogen attached to a ring carbon atom which is ortho or para to a phenolic hydroxyl group. The proper molar ratios of the THP and the phenolic compound to be used in making soluble adducts is such that the number of methylol phosphorous radicals is greater than the number of hydrogens attached to ring carbon ortho or para to phenolic hydroxyl groups. Preferably one phenolic molecule will be reacted with one THP molecule.

Solvents suitable for use in preparing the methylol phosphine adducts of this invention include water, dimethylformamide, alcohols, such as methanol, ethanol, and isopropanol, and mixtures of these compounds with water. The amount of solvent can be varied as desired. The adducts are used in solution, therefore, it is not necessary to isolate them. Catalysts are not necessary for conducting this reaction. However, it is particularly desirable to maintain pH of the system about from 6 to 8.

Suitable nitrogenous compounds for use with the phenolic-methylol phosphine adducts in the product of thermosetting polymers include virtually any soluble nitrogenous compound containing at least two members of the group consisting of hydrogen atoms and methylol radicals attached to trivalent nitrogen atoms. Examples of suitable amides include urea, thiourea, melamine, cyanamide, ethyleneurea, propyleneurea, dicyandiamide, hydroxyethylcarbamate, octadecamide, acrylamide, amino acids, methylol and alkylated methylol derivatives of these amides. Examples of suitable amines include ethylamine, methylamine, ethylenediamine, ammonia, aniline and cetylamine. Mixtures of these amides and amines can suitably be employed. Thermosetting polymers are principally prepared by agitating a mixture of the adduct and the nitrogen compound or compounds in a solvent system while heating until copolymerization occurs. The preferred relative amounts of methylol phosphine adduct and nitrogen compounds used to copolymerize can be calculated by conventional methods for condensation polymerization reactions assuming that the functionality of the adduct equals the number of methylol phosphorus radicals on the adduct and that the functionality of the nitrogenous agent is equal to the sum of the number of hydrogens and methylol radicals attached to trivalent nitrogen. Useful products may contain as little as about one mole of the soluble adduct per ten moles of nitrogenous compounds. The use of small quantities of the adduct with large quantities of the nitrogenous compound is made practical when the nitrogenous compound contains N-methyol radicals (N—$CH_2OH$) which permit the compounds to form condensation polymers even in the absence of the soluble methylol phosphine adduct. The maximum proportions of the soluble adduct that may be used with a nitrogenous compound for the production of useful polymers is about one mole of the adduct per mol of the nitrogenous compound.

In the production of flame-resistant organic fibrous materials by a heat cure process, the fibrous structure is wetted with a solution containing the soluble adduct and the nitrogenous agent; it is then passed through squeeze rolls to remove excess liquid. The structure is then dried and heated about from 10° to about 160° C. The pH of this treating solution may range about from 3 up to about 7.5. It is generally desirable for the treating solution to contain an acid producing catalyst such as zinc nitrate, magnesium chloride, hydrochloric acid, ammonium chloride, or a mixture of magnesium chloride and an organic acid such as citric acid. The amount of acid catalyst needed may be varied about from 0.5 percent up to about three percent based on the weight of the solution. The concentration of the adduct and the nitrogenous agent in the treating solution can be varied depending upon the amount of flame resistance to be imparted to the organic fibrous structure. Even one or two percent of the adduct and nitrogenous agent produces marked changes in the burning characteristics of the treated textile structure. Where complete flame resistance is to be contributed, about 10 to 20 weight percent must be applied to the textile structure.

In the treatment of organic fibrous structures by the ammonia cure process, the textile structure is wetted with a solution of the soluble phenolic methylol phosphine adduct, then the fabric is dried at a temperature ranging between about 70° C. and 120° C. Finally, the fabric structure is exposed to ammonia gas for a few seconds, generally from two to fifteen seconds. The time of the exposure to ammonia is not so important as the amount of ammonia applied to the fabric. The amount of ammonia applied should be adequate to react with essentially all of the P methylol radicals. If desired, one can complete the insolubilization of the adduct by first exposing the dry fabric to $NH_3$ gas for about 2 to 10 seconds then passing the fabric through a dilute solution of ammonium hydroxide. However, this order of treatment cannot be reversed. While ammonia is the most convenient nitrogenous gaseous product for use in this chemical cure, other amines may also be used, particularly methylamine and ethylamine. A preferred procedure for treating the textile structure with the amine is to force ammonia gas or methylamine through the textile structure. In this manner, reaction can be completed within one to three seconds.

Virtually any fibrous organic product capable of being impregnated with the soluble adduct can made flame resistant by use of this invention. Textiles suitable for use in this invention are woven, knit, or nonwoven structures. For best results, the textile structure should contain at least about 25% of a cellulosic fiber. Cellulosic fibers suitable for use in this invention include, cotton, rayon, ramie, flax, and the like fibers. Various noncellulosic natural fibers can also be used in this invention, such as wool and mohair. Nonocellulosic synthetic fibers suitable for use in this invention along with a cellulosic fiber are polyesters, nylons, acrylics, polyvinylchloride, and the like fibers. When cellulosic fibers are blended with flammable noncellulosic fibers it is preferable to have about 50% or more cellulosic fiber in the blend structure.

The following example is illustrative of the invention:

EXAMPLE 1

Soluble phenolic-methylol phosphine adducts were prepared by reating THP (melting point about 58° C.) as exemplified in Table I. These stable adducts were put into solution with an amine or amide to produce copolymer solutions as shown in Table II. The adducts were put on fabric by a padding process. All of the treated fabrics were dried at 85° C. for 1 minute. Then, the fabric was exposed to $NH_3$ for 6 minutes to insolubilize the adduct in or on the fabric as shown in Table III. Aliquots of the copolymer solutions from Table II were also applied to fabric by the padding technique. These fabrics were either heated at elevated temperatures and/or exposed to $NH_3$ gas to form insoluble flame retardants in or on the cotton as described in Table III. Parts of each fabric from Table III were laundered, then examined. All samples exhibited a significant degree of flame resistance. The copolymer solutions of Table II were polymerized as described in Table IV to produce insoluble thermosetting flame resistant products. All of the treated fabric exhibited good hand and strength, and formed a black carbonaceous char when exposed to flame indicating the presence of phosphorus.

TABLE I.—PREPARATION OF SOLUBLE PHENOLIC-METHYLOL PHOSPHINE ADDUCTS

| Adduct solution designation | Reagents in solution | Condition for the reaction |
| --- | --- | --- |
| 79-1 | 41.3 g. (0.33 mole) THP; 28 g. (0.33 mole) phenol; 113 g. ethanol, about (40% solids in solution). | Heated at 100° C. for 30 min. then cooled. |
| 79-2 | 41.3 g. (0.33 mole) THP; 14 g. (0.165 mole) phenol; 92 g. ethanol about (40% solid in solution). | Heated at 50° C. for 30 min. then cooled. |

TABLE II.—PREPARATION OF COPOLYMER SOLUTIONS FROM SOLUBLE ADDUCT AND AMIDES OR AMINES

| Copolymer solution designation | Adduct solution used | Amide or amine added to adduct |
|---|---|---|
| 79-3 | ¼ of adduct 79-1 which contains .08 mole THP, .08 mole phenol, 45 g. ethanol. | 5.4 g. urea in 7 ml. H₂O (.09 mole). |
| 79-4 | ---do--- | 56.6 g. of 30% aqueous methylolurea (0.1 mole). The methylolurea contained on the average 1.5 methylol groups per urea molecule. |
| 79-5 | ¼ of adduct 79-2 which contains .08 mole THP, .04 mole phenol, 38 g. ethanol. | 2.7 g. ethylenediamine (.082 mole) and 7 g. of H₂O. |
| 79-6 | ---do--- | 8.5 g. of 50% aqueous cyanamide (0.1 mole). |

TABLE III.—PREPARATION OF FLAME RESISTANT TEXTILES THROUGH USE OF SOLUBLE PHENOLIC-METHYLOL PHOSPHINE ADDUCTS

| Adduct or copolymer solution applied to fabric | Fabric treated | Conditions for depositing insoluble polymer in fabric | Approximate add-on of retardant after washing the treated textile | Properties of treated fabric | |
|---|---|---|---|---|---|
| | | | | Color | Match angle test |
| 79-1 | Polyester-cotton blend fabric | NH₃ gas for 6 minutes | 11.5 | White | 135 |
| 79-1 | Cotton print cloth | do | 12.5 | ---do--- | 120 |
| 79-2 | Polyester-cotton blend fabric | do | 13.6 | ---do--- | 135 |
| 79-2 | Cotton print cloth | do | 12.5 | ---do--- | 120 |
| 79-3 | Polyester-cotton blend fabric | NH₃ gas for 3 minutes heat 155° C. 3 minutes | 10.0 | Slightly yellow | 120 |
| 79-3 | Cotton twill | do | 9.2 | ---do--- | 120 |
| 79-4 | Polyester-cotton blend fabric | do | 10.2 | ---do--- | 90 |
| 79-4 | Cotton twill | do | 12.0 | ---do--- | 160 |
| 79-6 | Polyester-cotton blend fabric | Heat 155° C. for 3 minutes | 6.5 | ---do--- | 60 |
| 79-6 | Cotton twill | do | 7.9 | ---do--- | 100 |

TABLE IV.—PREPARATION OF INSOLUBLE THERMOSETTING FLAME AND GLOW RESISTANT POLYMERS THROUGH USE OF SOLUBLE ADDUCTS AND AMINES OR AMIDES

| Copolymer solution used | Temperature reaction, °C. | Time required to produce insoluble product, min. | Nature of polymer |
|---|---|---|---|
| 79-3 | 150 | 10 | White, insoluble in H₂O, ethanol, hard. Flame resistant and forms a black char when exposed to a flame. |
| 79-4 | 150 | 10 | Do. |
| 79-5 | 25 | <10 | White, insoluble in H₂O, acid and alkali. Formed within 10 min. at 25° C. Flame resistant and forms a black char when exposed to a flame. |
| 79-6 | 100 | 20 | Yellow, insoluble in H₂O, acid and alkali. Formed by heating on steam cone 20 min. Flame resistant and forms a black char. |

We claim:

1. A process for producing a water-soluble methylol phosphine-phenol adduct wherein the phosphine moiety is linked directly to an aromatic ring carbon located in a position ortho or para to the phenolic hydroxyl group of the phenol moiety, which process consists of reacting at a temperature of from 50° to 100° C. for a period of about 30 minutes in an alcoholic solution of pH within the range 6 to 8, tris(hydroxymethyl)-phosphine and a phenolic compound, which phenolic compound has at least one hydrogen atom attached to a carbon atom in the aromatic ring in a position ortho or para to the phenolic hydroxyl group, the relative amounts of the reactants being such that there is an excess of methylol phosphorus radical, the tris(hydroxymethyl)phosphine being considered tri-functional in the adduct reaction and the functionality of the phenolic compound being determined by the number of hydrogen atoms attached to aromatic ring carbon atoms that are positioned ortho and para to the phenolic hydroxyl group.

2. A process for producing a water-soluble methylol phosphine-phenol adduct wherein the phosphine moiety is linked directly to an aromatic ring carbon located in a position ortho or para to the phenolic hydroxyl group of the phenol moiety, which process consists of reacting at a temperature of from 50° to 100° C. for a period of about 30 minutes in an alcoholic solution of pH within the range 6 to 8, tris(hydroxymethyl)phosphine and a phenolic compound selected from the group consisting of phenol, cresol, catechol, resorcinol, hydroquinone and phloroglucinol, the relative amounts of the reactants being such that there is an excess of methylol phosphorus radical, the tris(hydroxymethyl)phosphine being considered tri-functional in the adduct reaction and the functionality of the phenolic compound being determined by the number of hydrogen atoms attached to aromatic ring carbon atoms that are positioned ortho and para to the phenolic hydroxyl group.

3. The process of claim 2 wherein the phenolic compound is phenol.

4. The process of claim 2 wherein the phenolic compound is cresol.

5. The process of claim 2 wherein the phenolic compound is catechol.

6. The process of claim 2 wherein the phenolic compound is resorcinol.

7. The process of claim 2 wherein the phenolic compound is hydroquinone.

8. The process of claim 2 wherein the phenolic compound is phloroglucinol.

References Cited

UNITED STATES PATENTS 3,404,187   10/1968   Kober et al. _____ 260—606.5 P

WERTEN F. W. BELLAMY, Primary Examiner